Oct. 29, 1968  R. W. G. HUNT ET AL  3,408,142
COLOR FILM PRINTING

Filed May 28, 1965  3 Sheets-Sheet 1

ROBERT W.G. HUNT
PATRICK M. FORSYTH
CHRISTOPHER J.V. ROBERTS
INVENTORS

BY R. Frank Smith
Morton A. Polster

ATTORNEYS

United States Patent Office 3,408,142
Patented Oct. 29, 1968

3,408,142
COLOR FILM PRINTING
Robert William G. Hunt, Wealdstone, Harrow, Patrick Matthew Forsyth, Hemel Hempstead, and Christopher Joseph V. Roberts, Wealdstone, Harrow, England, assignors to Eastman Kodak Company, Rochester, N.Y., a corporation of New Jersey
Filed May 28, 1965, Ser. No. 459,823
Claims priority, application Great Britain, June 5, 1964, 23,395/64
10 Claims. (Cl. 355—38)

ABSTRACT OF THE DISCLOSURE

An apparatus is provided for measuring the average reflectance and color balance of color prints appearing in sequence on a film strip. The strip is illuminated with white light, and output currents corresponding to color reflectances of selected component colors are produced by an array of photoelectric means such as photocells. Filters individual to the photocells produce signals which are integrated over a selected time period. Registers provide a visual digital indication of the color reflectance in each of the selected color components.

---

This invention relates to the manufacture of photographic color prints and, more particularly, to a method and apparatus for measuring the average reflectance and color balance of color prints appearing in sequence on a film strip.

When a photographic color print is viewed in a typical environment, the presence of other objects of known appearance in the observer's field of view provides a reference framework against which the color balance and density of the print is subconsciously compared. The quality of such color prints is thus dependent to a substantial extent upon their being produced with the correct color balance and density, as the human eye is unable to compensate for any deficiencies to the same extent as, for example, when viewing a projected transparency in a darkened room. In the mass production of photographic color prints it is therefore necessary to pay close attention to the color balance and density of the prints produced and to keep the average value of each of these factors in the prints produced on the first printing, as close as possible to the values which comprise the apparent optimum.

The past practice has been to control these factors by skilled technicians who visually assess the color prints being produced. This is usually done when the prints are in roll form before chopping them into separate prints. At the time, adjustments are made to the color printing apparatus producing the prints if an adjustment is considered necessary on the basis of the visual color balance assessments. Such assessment of color prints gives rise to many and various inaccuracies due to the subjective nature of the measurements. There is naturally considerable variance from technician to technician in the color balance assessment. This assessment may even vary in the judgment of any one technician in the course of time.

It is therefore customary to provide a further check on the color balance and density of the prints by periodically printing a test negative among the prints, e.g., at the beginning of each roll of paper, and after processing comparing the color print obtained with a standard print, either visually or instrumentally. This second assessment provides quantitative and more consistent measurements to be obtained, but even this approach can lead to wrong judgments if the test negative does not closely represent the average color balance of the negatives being printed.

The present invention provides a color print reflectometer comprising one or more light sources providing red, green and blue light which are arranged to illuminate part of a row of color prints. Photoelectric means are positioned to receive diffuse light reflected from or light transmitted by the illuminated color prints. Output currents are then developed to provide electrical signals related to the red, green and blue reflected or transmitted light intensities. Suitable means are included for moving each of the color prints in the row through the illuminated area past the photoelectric means and integrating means each adapted to receive one of the electrical signals from the separate photoelectric means to provide an indication of the integrated value.

The invention also provides a method of testing the color balance of a photographic color printing apparatus, which comprises uniformly illuminating simultaneously or successively with additive component colors red, green and blue. The transmitted or reflected light from at least 150 separate color prints which have been so exposed in the printing apparatus and subsequently processed is determined. Then, the total red, green and blue reflectances or transmittances of each of the prints is integrated and a recording of the three integral values is obtained.

The light source or combination of light sources used to provide the red, green and blue illuminating light in the apparatus may be of the incandescent or fluorescent types in which the individual sources or the combination of sources provide a "white" light containing the additive component colors red, green and blue. Alternatively, individual light sources may be used where each source provides one of the required illuminant components. The nature of the light source is also dependent upon the number of color prints which it is desired to assess simultaneously. Tubular fluorescent lights are particularly convenient for illuminating rows of such prints.

Photographic color printing apparatus normally uses rolls of photographic color paper which, after exposure, are processed in roll form and subsequently chopped into individual prints. It is most convenient therefore to measure the reflectance of the prints to assess the color balance of the printer while the prints are still in roll form so they may be easily transported through an illuminated area by conventional web handling means. The testing method of this invention can be practiced also by transporting or placing in the illuminated area the selected number of prints (such as 150, or more, for instance) individually.

The integrated reflectance of each print may be measured and the values added, or more preferably, the integrated reflectance of a series of prints may be measured at a time. It is possible alternatively to measure the transmittance of the prints but the effective contrast is then halved. When integrating the reflectance of a series of prints individual variations in color balance due to subject matter have less effect on the total reflectance figures. It is desirable to mask the edges of a roll of color prints while they are being illuminated and their reflectance measured, as these edges are normally white, and light reflected from them dilutes the reflected light. It is not easy to mask the individual white stripes occurring between each color print on the roll similarly when a series of prints is being measured together, as it is generally most convenient to move the strip continuously through the measuring area. In general, apparatus may be constructed in which each photocell measures the reflectances of each print individually, or two or more prints, at a time.

The photoelectric means which receives the diffuse light reflected from the illuminated color prints is usually arranged to receive light reflected normally from the prints while the illuminating light source is directed at an angle of about 45° to the normal. This arrangement eliminates specular reflection of the light source from the frequently glossy surface of the color prints.

The photoelectric means may be vacuum photocells, photovoltaic cells, photoconductive cells or photomultiplier cells. In general the choice of photoelectric means is governed by the stability of sensitivity which can be arranged and the nature of the means for integrating the electrical signals provided by the photoelectric means. These signals may be directly proportional to the illumination of the photoelectric means or may bear any other convenient relationship such as a logarithmic relationship. The latter relationship may be obtained by the method of use of some photocells such as by providing a high impedance load for a photovoltaic cell or including suitable feedback from the output to the dynode supply for a photomultiplier.

The integrating means may be of a conventional electrical charge integrator or an electro-mechanical integrator, such as an integrating motor. In either case the output must be displayed or be capable of self-recording.

The measurement is preferably made over a fixed preset period of time, by switching on the integrating means for a period which allows at least 150 prints to pass the illuminated area by means of an accurate timing device.

In order that the invention may be more clearly understood, one form of reflectometer will now be described with reference to the accompanying drawings in which.

Figure 1:
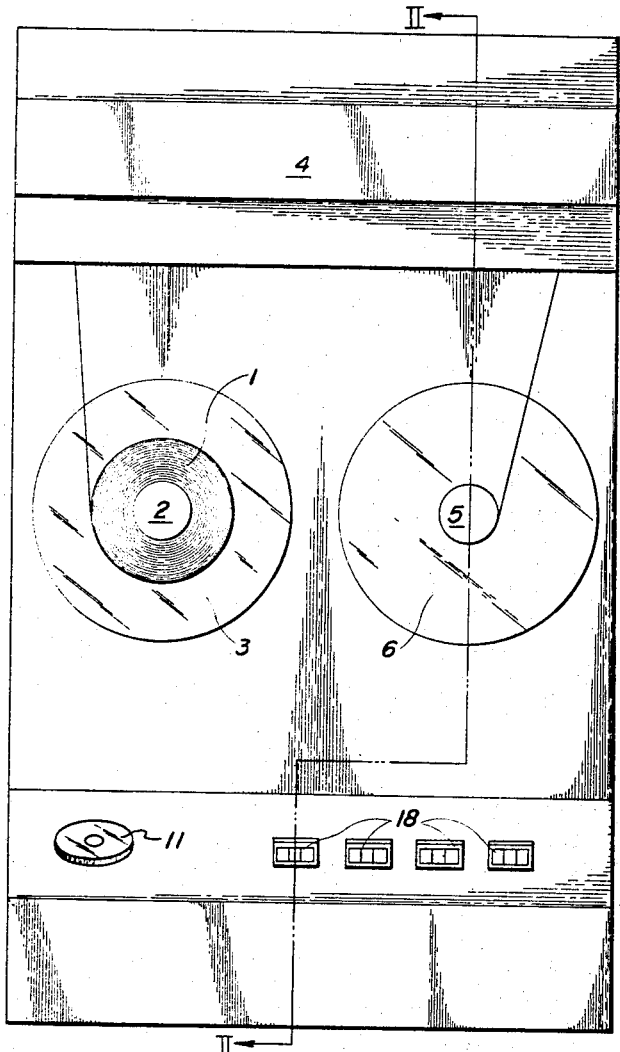
FIG. 1 is a schematic showing in front elevation of a reflectometer according to the invention.
Figure 2:
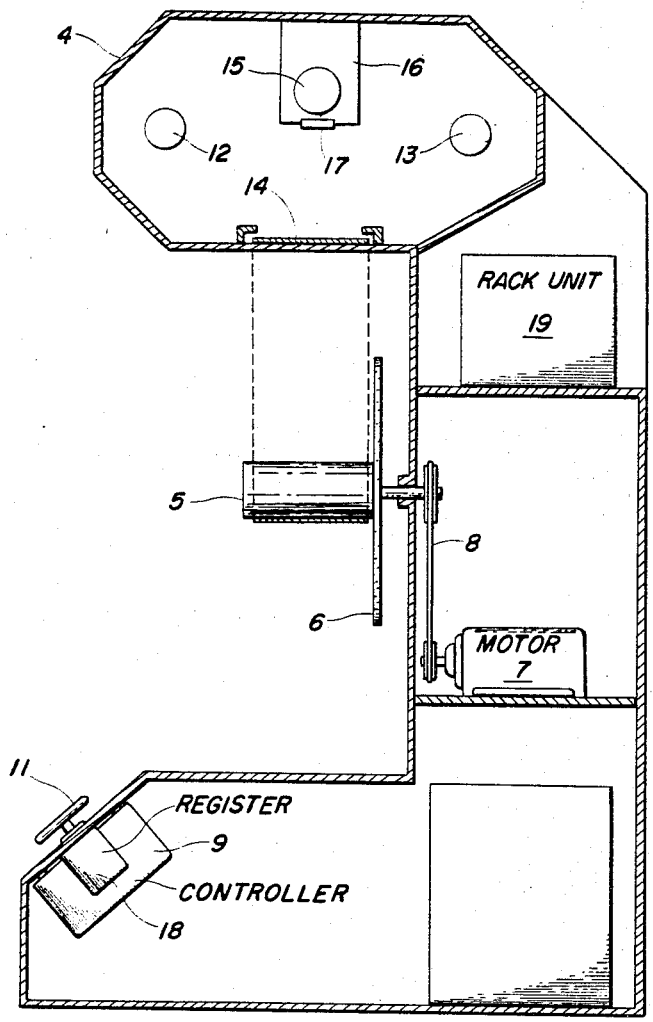
FIG. 2 is a cross-section of the reflectometer shown in FIG. 1 through the line II—II.

Referring now to the drawings, a roll of exposed and processed color photographic paper 1 bearing a series of color prints is carried (see FIG. 1, for instance) by a supply spindle 2 having a retaining flange 3. The leading edge of the roll passes through an illuminated area in the measuring head 4 and is anchored to a take-up spindle 5 having a retaining flange 6. The take-up spindle 5 is driven by an electric motor 7 (see FIG. 2) through a suitable drive exemplified illustratively by the chain 8. The speed of the motor 7 is controlled by alteration of its electrical supply through a controller 9, such as a variable transformer if alternating current energizing supply is used. The controller is adjusted by means of the control knob 11.

The measuring head 4 contains a light source in the form of two fluorescent tubes 12 and 13 located so that the light from them strikes the illuminated prints 14 at an angle of approximately 45° to the normal. The diffuse reflected light from the illuminated prints 14 is received by a row of vacuum photocells 15 located above the prints in a light-right partition 16, each cell having a filter 17 in front of it so that it is sensitive only to red, green or blue light, as the case may be.

The outputs from each of the photocells 15 are fed to a suitable integrating means in the form of a current to frequency converter. The converter provides constant amplitude pulses at a rate proportional to the illumination of the photocells. A register 18 is provided to record the pulses. The register 18 also indicates the number of pulses recorded and, therefore, the integrated value of the light reflected from the prints in one of its spectral regions.

The integrating means and all the associated electrical circuits are housed in the rack unit 19.

The distance of the light-tight partition 16 containing the photocells 15, from the illuminated color prints 14 together with the location of the photocells 15 within the partition 16 and their spacing from the filters 17, restricts the instantaneous field of view of each photocell to the area of two or three individual color prints on the illuminated portion 14. When vacuum photocells are used as the measuring photocells 15 it is found that their low red sensitivity compared with their blue and green sensitivities makes it preferable to duplicate the red filtered photocell. If the duplicated red filtered photocells are located side by side their combined field of view may cover the area of three of four color prints.

In the case of vacuum photocells the electrical signals from each of the photocells 15 consists of a direct current whose magnitude is directly proportional to the intensity of the illumination falling on the cell. This illumination will, in turn, be proportional to the red, green or blue reflected light intensities from the color prints received by the photocells.

Figure 3:
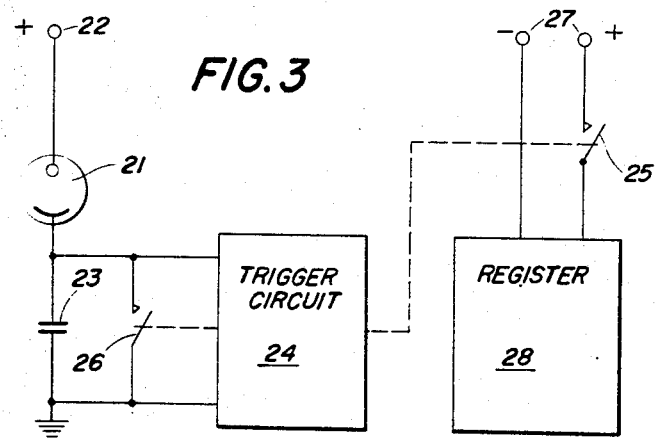
FIG. 3 is a circuit diagram of one form of integrating means which may be used in the reflectometer of the invention.

A particularly convenient form of integrating means consists of a capacitor which is allowed to charge from zero or a fixed initial potential to a second potential and then rapidly returned to the first potential. Such an arrangement is shown in FIG. 3 in which a vacuum photocell 21 energized by a source of positive potential (not shown) connected at terminal 22 passes a current which is proportional to its intensity of illumination to a capacitor 23. The potential developed across the capacitor 23 will increase and its value at any instant will be proportional to the integral of the current passed by the photocell with respect to time. When the potential reaches some predetermined value corresponding to a predetermined value of charge on the capacitor 23 a voltage sensitive switch 24, such as the well-known type of Schmitt trigger circuit or a thyratron, operates relay contacts 25 and 26 of a relay (not shown but represented by the dash-dot lines connecting the elements).

Closure of relay contact 26 discharges the capacitor 23. Contact 25 connects a suitable power supply 27 (not shown except as to terminal polarities) to a register 28. This relay is also closed by operation of the Schmitt trigger circuit 24.

Other switching means such as diode gates may replace the contact 26. It is important that the duration of the switching operation of contact 26 is short compared with the shortest time taken to charge the capacitor 23 to the predetermined voltage and that the duration of the switching operation of the contact 25 is long enough to insure operation of the register 28. This may be provided by any known form of quick-acting relay. If necessary the duration of operation of the contact 25 may be made greater than that of contact 26, as can readily be insured by a slow-release relay, or in the event that the relay is fast-acting a fast electronic sealing circuit which divides by a constant amount may be inserted between the voltage sensitive switch 24 and the register 28.

For timing the duration of the integration of the light reflected from the color prints an interval timer may be used which allows the registers to operate for a fixed time. Alternatively, the time may be related to the intensity of the illuminating source thus making the integral values obtained less dependent on variations in this source. In such an arrangement a portion of the light from the illuminating source is allowed to fall directly on a photocell which is connected to an integrating means as previously described. A predetermined reading on the register 28 associated with this photocell is taken as the end of the integration period or used to end this period, or the integration period may be extended by increasing the size of the integrating capacitor so that a single operation of the associated voltage sensitive switch ends the integration period.

Figure 4:
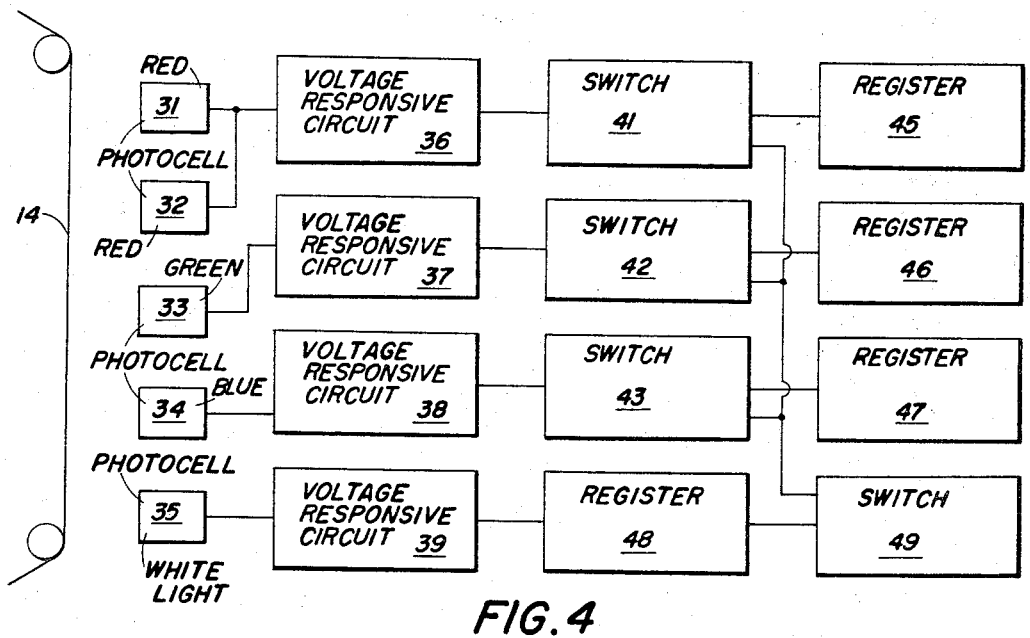
FIG. 4 is a block diagram of the electrical system of the reflectometer of FIG. 1.

A schematic block circuit diagram with legends for the various components comprising a reflectometer according to the invention is shown in FIG. 4.

Two red sensitive or red filtered photocells 31 and 32 supply a current proportional to the intensity of the red light reflected from a passing row of color prints 14 to a capacitor and associated voltage sensitive circuit 36 of the type schematically shown by FIG. 3. The illuminating source is not shown by FIG. 4 but will be understood to be similar to that exemplified by FIG. 8. Similarly, photocells 33 and 34 supply currents proportional to the green and blue light reflected from the prints to similar types of capacitor and voltage sensitive circuits 37 and 38, respectively. If filters are used with the photocells one group which has been successfully employed used two layers of a wratten 29 for the red; a wratten 61+16, for the green, and a wratten 47B for the blue. Other similar filters may be used for obtaining other variances.

Photocell 35 supplies a current proportional to the intensity of the print illuminating lights to the capacitor and voltage sensitive switch 39, also of similar type. The pulse outputs from the capacitor and voltage sensitive switch circuits 36, 37 and 38 are fed to registers 45, 46 and 47 through switches 41, 42 and 43 (similar to the switch elements 26 and 25 described in FIG. 3) controlled by a timing switch 49 (similar to the Schmitt trigger 24 of FIG. 3. The pulse output from the circuit 39 is fed to a timing register 48. In operation the registers 45, 46, 47 and 48 are set to zero and the timing switches 41, 42 and 43 closed. Pulses are fed to the registers and their recorded values represent the integrated red, green and blue reflectances of the passing color prints. When the register 48 reaches a predetermined value corresponding to the passage of about 50 to 150 prints through the apparatus the timing switch 49 is operated opening the switches 41, 42 and 43 so that the readings of the registers 45, 46 and 47 may be recorded. It is, of course, possible to use self-recording registers which print the reading at the end of the integration or record it as code punches on tape.

From the foregoing, it will be apparent that the electrical currents derived as a result of current flowing through photocells under illumination from the film strip cause either charge or discharge of electrical storage units (capacitors) through pre-set voltage ranges. Digital outputs are obtained. The digital outputs are much easier to read without errors than would be analog representations.

The operation provides that the capacitors or condensers shall be charged or discharged a substantial number of times while the individual film strip is being explored and tested for color balance. This provides adequate accuracy and makes it possible to record whole digitals only. The timing of the period over which the integration process occurs is controlled by separately illuminated photocells and condenser circuitry generally similar to that used for obtaining the digitized output. The registers schematically represented at 28, as well as at 45, 46 and 47, are chosen of a type whereby the counting impulses preferably cause the displayed numbers to decrease by one each time the counter is activated. This insures that the displayed number will be large, if the average density of the prints measured is high, but it will be low if the density is small. Under the circumstances, the displayed number in the register is made proportional to the average density. Further than this, the numbers to which the counters reset on receipt of resetting pulses, as from the schematically designated unit 49, are so chosen that a standard or reference strip of prints produces a displayed number equal to an average density.

In another form of the invention, a color printer may be adjusted automatically by feeding into it appropriate signals derived from the red, green and blue reflectance measurements.

Impulses from the red, green and blue current to frequency converters instead of actuating a register cause rotary switches to revolve by means of relays and suitable gearing. These switches, whose angular movement is proportional to the number of pulses received, are connected by a servo-mechanism to similar switches on the color printer which control the printer exposure.

Figure 5:
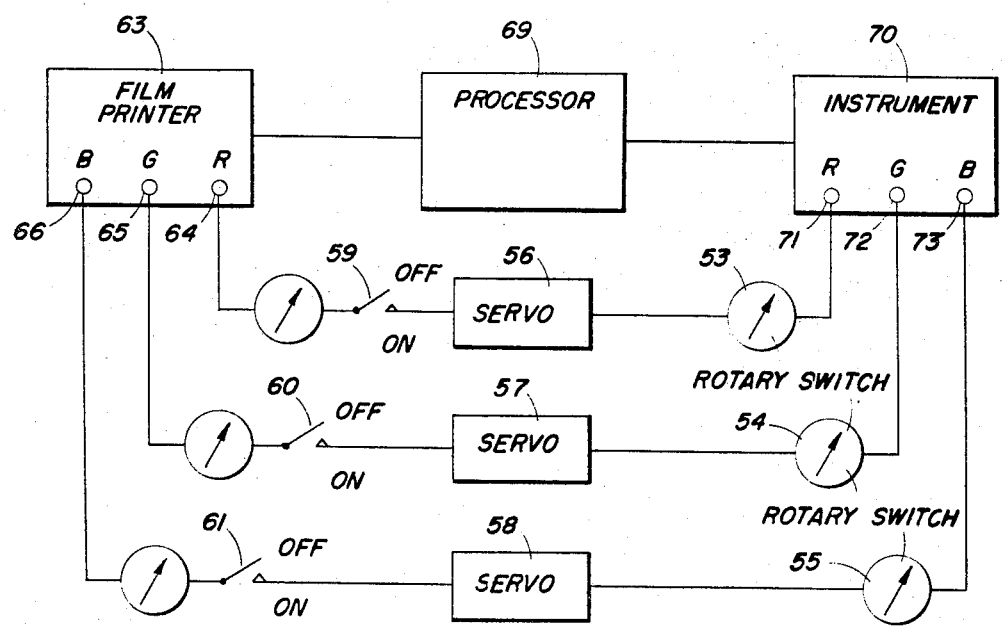
FIG. 5 is a schematic representation of a modification providing for automatic printer adjustment under control of derived reflectance measured signals indicative of each selected component color.

The operation of the invention of this form, as depicted particularly by FIG. 5, is such that the impulses from the photocells are used to charge the condensers (not shown) in accordance with the intensity of the red, green and blue lights. Instead of actuating a counter directly, as by the first-described embodiment, the produced currents cause a plurality of rotary switches to revolve by means of relays and suitable gearings (not shown). The rotary switches, schematically represented by FIG. 5, are shown as 53, 54 and 55. The angular movement of the switch is made proportional to the digital output as effective at the various register units 45, 46 and 47, for instance, contained within the schematic showing of the instrument 70. These switches 53, 54 and 55, having their angular movement made proportional to the heretofore described digital output, connect to the schematically represented servo-mechanisms 56, 57 and 58, respectively. The servo-mechanisms connect on the printer side with individual switches 59, 60 and 61 which, in turn, control the exposure of the schematically represented printer 63 by way of the connections for the red, green and blue outputs connected at terminal points 64, 65 and 66.

In this arrangement, the servo-mechanisms are discontinuous in their operation and function during that time period following the cut-off of pulses to the relays 25 and 26, or 41, 42 and 43, for instance, as the case may be, prior to resetting for the next reading under the control of some reset circuitry as depicted and schematically represented at 49. The exposure of the controlling switches on the printer is not altered during the time that the densitometer pulser is being accumulated, but only between successive determinations of the average density of color balance. By the schematically shown form of FIG. 5, the processor unit is schematically represented at 69. The recording instrument 70 has its outputs indicative of the current produced by the condenser, which are representative of red, green and blue, respectively, being supplied by way of terminals 71, 72 and 73 in the indicated conductor to the rotary switches.

The servo operation is not continuous but operates only during the periods after the interval timer has cut off the pulses to the relays and before it has been reset for the next reading. In this way the exposure controlling switches on the printer are not altered while the reflectometer pulses are being accumulated, but only between successive determinations of average density and color balance.

This arrangement makes it possible to print and process rolls of color prints continuously and to control the printer exposures in the manner described above by monitoring the rolls of prints immediately after processing.

Having now described the invention what is claimed is:

1. Apparatus for measuring the average reflectance and color balance of a plurality of color prints arranged in strip formation comprising means for illuminating the film strip with substantially white light, means for producing from the illuminating light as reflected by the film strip separate output currents indicative of the light reflectance of the strip in each of a plurality of selected additive component colors, means for integrating the produced currents over a selected time period, means for registering visual indications to exemplify selected color reflectances, and means for controlling the registering means in accordance with the magnitude of the integrated signal currents following the expiration of a selected time period.

2. Apparatus for measuring the average reflectance and color balance of a plurality of color prints arranged in strip formation comprising means for illuminating selected sections of the film strip with substantially white light, means for producing from the illuminating light as reflected by the film strip separate output currents indicative of the light reflectance of the strip in each of a plurality of selected additive component colors, means for integrating the produced currents over a selected time period, means for registering visual indications to exemplify selected color reflectances, and means for controlling the registering means in accordance with the magnitude of the integrated signal currents following the expiration of a selected time period.

3. Apparatus for measuring the average reflectance and color balance of a plurality of color prints arranged in strip formation comprising means for illuminating in sequence selected uniform sections of the film strip with substantially white light, a plurality of photoelectric means of a number corresponding to the selected component colors of which the film prints are formed for producing from the illuminating light as reflected by the film strip separate output currents, filter means associated with each photoelectric means to control the in-falling light on the separate photoelectric means whereby each output is indicative of the light reflectance of the strip in one of the selected plurality of selected additive component colors, means for integrating the produced currents over a selected time period, registering means for visually indicating digitally the color reflectance in each of the selected color components, and means for controlling and energizing the registering means in accordance with the magnitude of the integrated signal currents at uniformly spaced selected time periods.

4. Apparatus for measuring the average reflectance and color balance of color prints appearing in a sequence on a film strip which comprises means for illuminating the strip, means for selecting from the illuminated strip color reflectances in light of each of a plurality of additive component colors, means for converting the light reflectances into electrical currents, means for detecting and integrating over time the produced currents, means for converting the integrated currents to digital information, registering means for displaying the produced digital information for visual observation, and means for releasing the integrated and averaged produced currents for controlling the registering means at selected time periods.

5. Apparatus for controlling the printing of color images on a record strip in substantially correct average density and color balance representing color prints appearing in a sequence on a film strip which comprises means for illuminating selected portions of the film strip, means for producing signal currents proportional to the light reflectance of the illuminated strip regions in each of a plurality of additive component colors, means for integrating the produced currents over time periods of controllable duration, film printer means, servo means to control the printer means, means for controlling the printer means for converting the produced currents to digital information, means for displaying the produced digital information for visual observation, and switching means for applying the produced currents averaged over selected time periods to control the servo means and printer means.

6. A method of measuring the average reflectance and color balance of color prints appearing in sequence on a film strip which comprises the steps of illuminating the strip, selecting from the illuminated strip color reflectances in each of a plurality of additive component colors, producing from the selected reflectances output currents indicative of the selected reflectances, detecting and integrating over time the produced currents, converting the produced currents to digital information, displaying the produced digital information for visual observation, and then averaging the produced currents over a selected time period.

7. The method as claimed in claim 6, comprising the additional steps of printing records from the strip, altering the density and color balance of the printer under the control of the integrated currents thereby to minimize the differences between the amounts of light in the selected component colors reflected by a plurality of prints of a standard density and color balance and the plurality of prints produced by the printing.

8. A method of measuring the average reflectance and color balance of selected numbers of color prints arranged in strip array which comprises illuminating selected sections of the strip from a plurality of compact light sources, deriving light reflectance values in each of a plurality of component colors from the illuminated strip, converting the several derived component-color light values into electrical currents of magnitudes proportional to the light intensity reflected by said prints, integrating the produced currents over selected time periods to produce digital signal information thereby comparing the produced currents with selected optimum standards, and displaying the digital information for optical observation to represent the red, green, and blue light for reflectances of said prints.

9. A method of measuring the average reflectance and color balance of selected numbers of color prints arranged in strip array which comprises illuminating selected sections of the strip from a plurality of compact light sources, filtering the light reflectances from the strip thereby to derive light values in each of a plurality of component colors from the illuminated strip, converting the several derived component-color light values into electrical currents of magnitudes proportional to the light intensity reflected by said prints, integrating the produced currents over selected time periods to produce digital signal information thereby, comparing the produced currents with selected optimum standards to establish printing control, and displaying the digital information for optical observation to represent the red, green, and blue light reflectances of said prints.

10. Apparatus for measuring the reflectance and color balance of a color print comprising, means for illuminating the print, means for producing from light reflected by the print output curernts indicative of the light reflectance of certain colors of the print, means for integrating the produced currents, and means for registering visual indications of color reflectances in response to the output of the integrating means.

References Cited

UNITED STATES PATENTS

| | | | |
|---|---|---|---|
| 3,019,703 | 2/1962 | Kilminster | 88—24 |
| 3,041,932 | 7/1962 | Kilminster | 88—24 |
| 3,060,790 | 10/1962 | Ward | 88—24 X |

NORTON ANSHER, *Primary Examiner.*

RICHARD A. WINTERCORN, *Assistant Examiner.*

U.S. DEPARTMENT OF COMMERCE
PATENT OFFICE

UNITED STATES PATENT OFFICE
CERTIFICATE OF CORRECTION

Patent No. 3,408,142                 October 29,

Robert William G. Hunt et al.

It is certified that error appears in the above identified patent and that said Letters Patent are hereby corrected as shown below:

Column 3, line 60, "light-right" should read -- light-tight --. Column 5, line 5, "Fig. 8" should read -- Fig. 2 --; line 22 "Fig. 3." should read -- Fig.3). --. Column 8, line 26, cancel "for"; line 46, "curernts" should read -- currents --.

Signed and sealed this 27th day of January 1970.

(SEAL)
Attest:

Edward M. Fletcher, Jr.
Attesting Officer

WILLIAM E. SCHUYLER, JR.
Commissioner of Patents